(12) United States Patent
Venkatasubramanian

(10) Patent No.: US 7,234,143 B2
(45) Date of Patent: Jun. 19, 2007

(54) SPIN-YIELDING IN MULTI-THREADED SYSTEMS

(75) Inventor: Lakshminarayanan Venkatasubramanian, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 754 days.

(21) Appl. No.: 10/177,453

(22) Filed: Jun. 20, 2002

(65) Prior Publication Data

US 2003/0236816 A1 Dec. 25, 2003

(51) Int. Cl.
*G06F 9/46* (2006.01)
(52) U.S. Cl. ............ 718/102; 718/100; 718/108
(58) Field of Classification Search ........ 718/100, 718/102, 104, 107–108; 710/200
See application file for complete search history.

(56) References Cited

U.S. PATENT DOCUMENTS

| 6,687,904 B1 * | 2/2004 | Gomes et al. | 718/102 |
| 2001/0014905 A1 * | 8/2001 | Onodera | 709/102 |
| 2003/0041090 A1 * | 2/2003 | Armstrong et al. | 709/106 |

OTHER PUBLICATIONS

A. Silberschatz & Peter Galvin: Title:"Operating System Concepts (Fourth Edition)" 1994, Addison-Wesley Publishing Company; Reading, Massachusetts; XP002272994; ISBN: 0-201-59292-4 pp. 176, 177, 668, 670, 97-116; 163-181; 659-671 Relevant to claim 1-7,9,10.
L. Kontothanassis, R. Wisniewski, M. Scott Title "Scheduler-Conscious Synchroniozation" ACM Transactions on Computer Systems, Association For Computing Machinery, New York, USA, vol. 15, No. 1, Feb. 1, 1997, pp. 3-40 XP000689758; ISSN: 0734-2071 pp. 6, 33, and 1-6; Relevant to Claim 1-7,9,10.
S. Nagar, et. al. Title: "Alternatives to Coscheduling a Network of Workstations" Journal Of Parallel & Distributed Computing, Academic Press, Duluth, MN; vol. 59, No. 2; Nov. 1999 pp. 302-327; XP004408372 ISSN: 0743 7315 pp. 308, 310, 313; Relevant to claim 1-10.
J. Zahorjan, et al. Title: The Effect of Scheduling Discipline on Spin Overhead in Shared Memory Parallel Systems IEEE Transactions on Parallel and Distributed Systems; Apr. 1991; USA; vol. 2, No. 2, pp. 180-198, XP002272993 ISSN: 1045 9219; p. 180-184; Relevant to claim 1-10.
Andrew Tucker, et al. Title: "Process Control and Scheduling Issues For Multiprogrammed Shared-Memory Multiprocessors" Operating Systems Review, 1989, USA, vol. 23, No. 5, pp. 159-166, XP002272992 ISSN: 0163-5980; pp. 159-161; Relevant to Claim 1-10.
N. Elmasri, et al. Title: "The Threaded Communication Library: Preliminary Experiences on a Multiprocess With Dual-Processor Nodes." Proceedings Of The International Conference On Supercomputing, Barcelona, Jul. 3 7, 1995, New York, ACM, US, pp. 195-199, XP000546281 ISBN: 0-89791-728-6; p. 195; Relevant to Claim 1.

* cited by examiner

*Primary Examiner*—Meng-Al T. An
*Assistant Examiner*—Kenneth Tang

(57) ABSTRACT

Techniques are provided for use in spin-yielding in multi-threaded systems. Each thread that is waiting for a lock is bound to a spin-yield processor in the list of a plurality of spin-yield processors so that other processors that otherwise may be used for spin-yield cycles by the waiting threads can be used for other purposes by other threads. Further, in a defined time period, a thread is bound to or removed from a spin-yield processor based on the number of context switches experienced by that thread in that defined time period.

20 Claims, 2 Drawing Sheets

SPIN-YIELDING IN MULTI-THREADED SYSTEMS

FIELD OF THE INVENTION

The present invention relates generally to multi-threaded systems and, more specifically, to spin-yielding in such systems.

BACKGROUND OF THE INVENTION

In multi-threaded programs, protecting some portions and/or variables of a program from being accessed by multiple threads is desirable. In one approach using a lock mechanism, a thread, in accessing a protected portion, acquires a lock and thus prevents other threads from accessing the same portion during the time the thread retains the lock. When the thread releases the lock, another thread may acquire the lock to access the protected portion and prevent other threads from accessing the same portion.

A thread waiting for the lock may be put in a sleep queue and transferred to a run queue when this waiting thread is ready to execute. However, transferring a thread between the sleep queue and the run queue is usually expensive. Approaches have been developed in which the waiting threads execute some spin-yield cycles before being transferred to the sleep queue. In these approaches, a waiting thread, while waiting for a lock, spins on a processor for a few cycles, then tries to acquire the lock. If the thread cannot acquire the lock, then the thread yields the processor, i.e., makes it available for use by other threads. The waiting thread repeats the spin-yield cycles for a few times up to a threshold, at which time the waiting thread is put into the sleep queue. Experience shows that the waiting threads can usually acquire the lock in a few tries without being transferred to the sleep queue.

However, in various situations such as in applications in which lock contention is heavy and/or the thread holds on to the lock for a long time, the spin-yield threads in many cases are eventually put to the sleep queue. During the spin-yield time, the processors performing the spin-yield cycle cannot accomplish other useful work, and the spin-yield threads may generate a lot of expensive system calls. In symmetric multiple processor systems with many processors, this effect can be pronounced.

Based on the foregoing, it is desirable that mechanisms be provided to solve the above deficiencies and related problems.

SUMMARY OF THE INVENTION

The present invention, in various embodiments, provides techniques for use in spin-yielding in multi-threaded systems. In one embodiment, a process with n threads runs on m processors and l "spin-yield" processors. Each thread that is waiting for a lock is bound to a spin-yield processor in the list of l spin-yield processors so that the m processors that otherwise may be used for spin-yield cycles by the waiting threads can be used for other purposes by other threads. Further, in a defined time period, a thread is bound to or removed from a spin-yield processor based on the number of context switches experienced by that thread in that defined time period.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Figure 1:
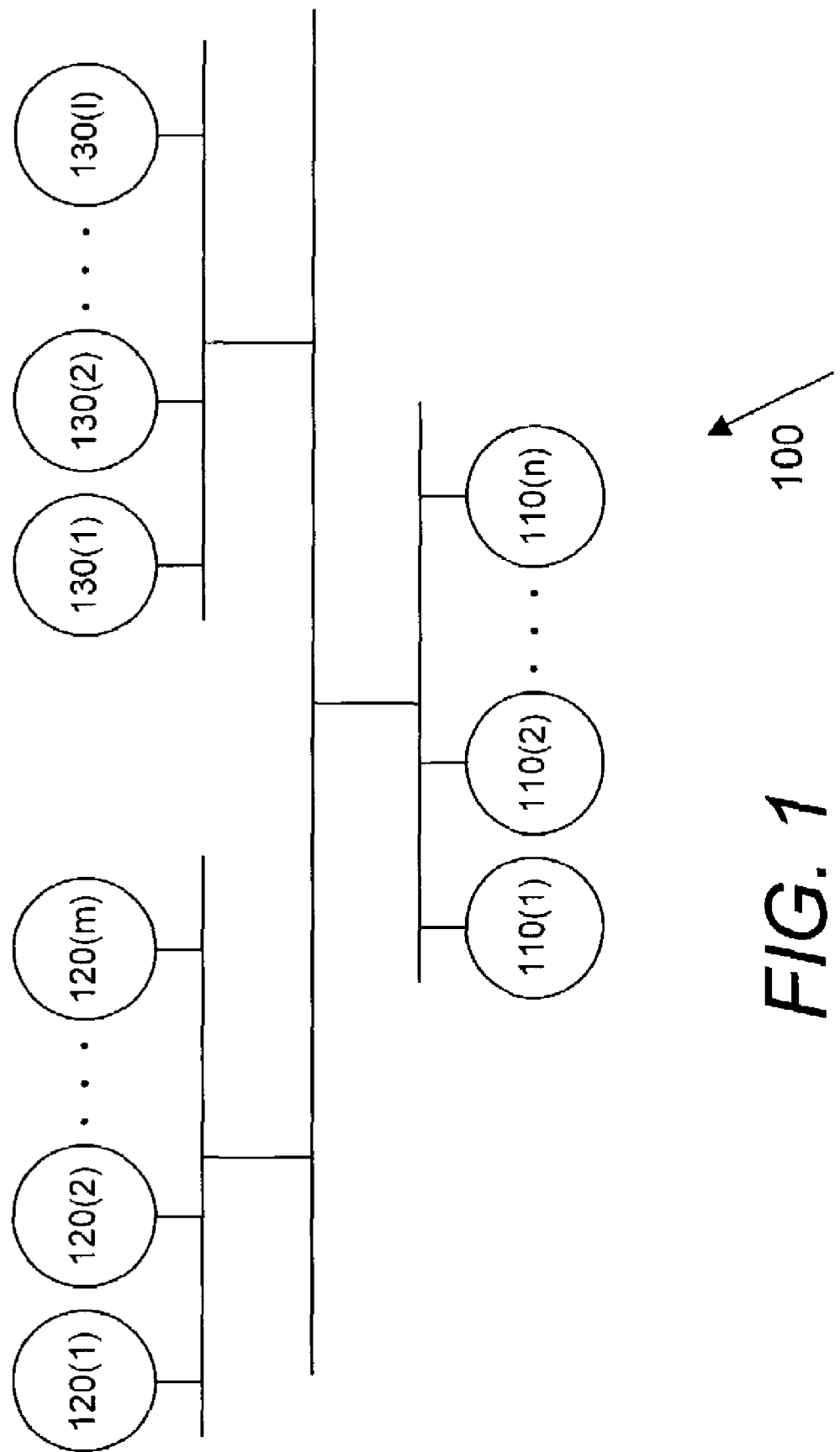
FIG. 1 shows a system upon which embodiments of the invention may be implemented.

FIG. 1 shows a system 100 upon which embodiments of the invention may be implemented. System 100 includes a plurality of threads, processors, and "spin-yield" processors, which, for illustration purposes, are named threads 110(1) to 110(n), processors 120(1) to 120(m), and spin-yield processors 130(1) to 130(l), respectively. Threads 110, processors 120, and spin-yield processors 130 communicate with one another via appropriate buses. The integers n, m, and l indicate that the number of threads 110, processors 120, and spin-yield processors 130 varies and can be random.

The Thread

A thread 110 is a part of a program that can execute independently of other parts. Each thread 110 is associated with a thread identity (TID), and a plurality of threads 110 can be part of a process with a process identity (PID). Because a thread 110 is simpler and less expensive to create than a full-blown process in terms of CPU time and other system resources, a thread 110 may be referred to as a "light-weight process." Threads 110 in the same process share system resources, such as memory, allocated for the process. Threads 110 may be found in various applications such as the C and C++ applications, the Java applications, the Java Virtual Machine, the enterprise applications including, for example, web servers, database servers, business-to-business logic, etc. Normally, one process runs on one processor. However, a process having multiple threads 110 can run on multiple processors because a thread 110 can run on a processor. A thread 110 ready to execute stays in a run queue from which a scheduler schedules the run time for the thread. A thread 110 that is not ready to execute stays in a sleep queue and is brought to the run queue when the thread is ready to execute.

Depending on applications, a plurality of threads 110 may concurrently access various portions of a program. However, only one thread may access a "protected" variable, piece of code, or portion of a program. A protected portion is usually a critical section of the program wherein uncontrolled modifications of the section may produce unwanted results. A variable of a monetary account balance is an example of a protected variable included in a protected portion. Concurrently accessing this monetary variable to modify it may result in inaccurate and undesirable results. When a thread accesses a protected portion, the thread acquires a lock for that portion, and thus prevents other threads from concurrently accessing the same portion because accessing the protected portion requires the lock. A lock mechanism is commonly performed by the operating system running the application.

For illustration purposes, a thread holding a lock is referred to as a thread 110L while a thread waiting for a lock is referred to as a thread 110W. In one embodiment, a waiting thread, e.g., thread 110W(1) is bound to a dedicated spin-yield processor 130, e.g., processor 130(1), after thread 110W(1) has spin-yielded on a processor 120 for a time exceeded a configurable threshold $t_1$. This threshold $t_1$ varies and can be as low as 0. A threshold $t_1$ of 0 indicates that as soon as thread 110W(1) starts waiting for a lock, thread 110W(1) is bound to a spin-yield processor 130. A non-zero threshold$t_1$ indicates that thread 110W(1) spins-yields on a processor 120 for some time up to the threshold$t_1$ after which thread 110W(1) is bound to a spin-yield processor 130. A user may determine the value of threshold $t_1$ based on factors such as the user's experience related to the system, the average number of spin-yield cycles that a thread 110W experiences before acquiring a lock, the number of threads 110 that are not waiting for a lock and can potentially do other work, etc. For example, if the user determines that it will take a long time for thread 110W(1) to acquire the lock and/or the processor 120(1) on which thread 110W(1) is spinning can otherwise do other work, then the user may set a low threshold $t_1$. This enables thread 110W(1) to be bound to a spin-yield processor 130 within a short time. However, if it takes only a short time to acquire the lock and/or the system can afford processor 120(1) for spin-yielding, then the user can set a higher threshold$t_1$. Threshold $t_1$ may be in real time, e.g., milliseconds, seconds, or in other time units such as the number of cycles thread 110W(1) has been spin-yielding, the number of processor cycles, the number of context switches etc.

In one embodiment, spinning refers to executing a few no-operation (NO-OP) statements, and yielding refers to releasing the processor for use by other threads. The term spin-yield is used as a custom. A spin-yield cycle includes spinning, unsuccessfully acquiring the lock, yielding the processor, and being transferred to the run queue, normally at its end. For example, thread 110W(1), while waiting for a lock, spins for some time, then tries to acquire the lock. If thread 110W(1) acquires the lock, then thread 110W(1) becomes a thread 110L that has a lock and prevents other threads from acquiring the same lock. However, if thread 110W(1) cannot acquire the lock, then thread 110W(1) yields the spin-yield processor 130(1) for use by another waiting thread 110W, and is transferred to the run queue waiting to again run or spin on a spin-yield processor. Thread 110W(1) then repeats spinning, trying to acquire the lock, yielding the processor, and being transferred to the run queue several times, up to a threshold$t_2$ at which time thread 110W(1) is put in the sleep queue. Similar to the above-discussed threshold$t_1$, threshold $t_2$ may be in real time or in other time units. In one embodiment, thread 110W(1) repeats the spin-yield cycles on the same spin-yield processor, e.g., processor 130(1). That is, each time thread 110W (1) returns from the run queue to spin again, thread 110W(1) spins on the same processor 130(1). In an alternative embodiment when a thread 110W is bound to a group of spin-yield processors 130, each time thread 110W(1) returns from the run queue to spin again, thread 110W(1) spins on any processor 130 in the list that may be appropriate at that time. A processor 130 with a short list of threads to run on is an example of a good candidate to be selected for spin-yield purposes. In one embodiment, binding a thread 110W to a spin-yield processor 130 invokes a system call to function MPCTL, which is commonly found in the Unix operating systems. Function MPCTL specifies a thread to run on a processor or a group of processors if it is supported by the operating system. When a thread 110W is bound to one or a group of spin-yield processors 130, this thread 110W runs exclusively on processors 130 and is not allowed to run on any processor 120, which enables processors 120 to perform other tasks not related to spin-yield cycles. This improves system performance.

The Processor

Processors 120 are commonly found in computers and may be referred to as the brain of the computers. Generally, processors 120 execute instructions stored in memory, control logic, process information, perform arithmetic and logical operations, etc. A thread 110 may run on a processor 120. A scheduler schedules a thread 110 to run on a particular processor 120 or 130.

The Spin-Yield Processor

A spin-yield processor 130 is similar to a processor 120, but is dedicated to spin-yield purposes. That is, spin-yield processors 130 serve all threads 110W that are waiting for a lock. The number l of spin-yield processors 130 can be as low as one and varies depending on various factors, including, for example, the number of total processors available in the system, the number of threads 110 running against the number of processors, the number of "free" processors available for spin-yield purposes, etc. Normally, the higher the number of waiting threads 110W, the higher the number of processors 120 are provided as spin-yield processors 130. Using multiple processors 130 for spin-yield purposes allows multiple threads 110W to spin-yield concurrently. For example, a thread 110W(1) spin-yields on a processor 130 (1), a thread 110W(2) spin-yields on a processor 130(2), a thread 110W(3) spin-yields on a processor 130(3), and these three processors 130(1), 130(2), and 130(3), instead of one processor 130, serve the total number of spin-yield cycles for three threads 110W(1), 110W(2), and 110(3).

Selecting a processor 120 as a spin-yield processor 130 may be done in different ways, including, for example, randomly selecting a processor 120, or, at the time of selection, selecting a processor 120 that is relatively free, e.g., scheduled to perform less work than another processor 120, etc.

Voluntary Context Switch

A voluntary context switch occurs when a thread running on a processor voluntarily yields this processor for use by other threads. This usually happens when a thread makes a system call to sleep, to yield, etc. In one embodiment, a thread, e.g., thread 110(1) is bound to or removed from a spin-yield processor, e.g., processor 130(1), based on the number of voluntary context switches experienced by thread 110(1) within a defined time period. For example, if, within 10 seconds from time t1 to time t2, thread 110(1) experiences more than a threshold of, e.g., 50 context switches, then thread 110(1) is bound to a spin-yield processor, e.g., processor 130(1). Similarly, if thread 110(1) has been bound to a spin-yield processor, e.g., processor 130(1), and, if, within a defined time period, thread 110(1) experiences less than 50 context switches, then thread 110(1) is released or unbound from processor 130(1). In one embodiment, when released, thread 110(1) is transferred to the run queue to be scheduled to execute on a free processor 120. The number of voluntary context switch is normally kept by the operating system.

Voluntary context switch is used as an example. The above-described techniques may be used for involuntary context switches, which are caused by the operating system or other appropriate units when, for example, the time slice reserved for the thread has expired, the thread is preempted by another thread or process with higher priorities, etc.

In one embodiment, various parameters such as the time interval, the threshold, and the number of spin-yield processors are implemented as variables for use by programs. A thread is designated to use these variables to bind or free threads from spin-yield processors 130 in accordance with the techniques described above.

Improving System Performance

The techniques described in this document can improve system performance. While two experiments were performed, one without and one with dedicated spin-yield processors, the experiment with dedicated spin-yield processors showed better system performance. In both experiments, one hundred fifty threads 110 and eight processors were used in which fifty threads 110 were arranged as threads 110W, i.e., they were waiting to acquire a lock and thus performed spin-yield cycles. For illustration purposes, the remaining one hundred threads 110 that were not spin-yielding were referred to as threads 110N, and performed a set of exemplary tasks. In the first experiment without dedicated spin-yield processors, one hundred threads 110N and fifty threads 110W ran their tasks on the eight processors, and, as averaged from ten runs, it took about 269 seconds for these threads 110N and 110W to perform their tasks. In the second experiment, two of the eight processors were dedicated as spin-yield processors 130, and thus there remained six processors 120. While fifty threads 110W were spin-yielding on two spin-yield processors 130, one hundred threads 110N performed the same exemplary tasks on the six processors 120. As a result, in average of ten runs, it took about 169 seconds, instead of 269 seconds, for one hundred threads 110N and fifty threads 110W to complete the same tasks.

Computer System Overview

Figure 2:
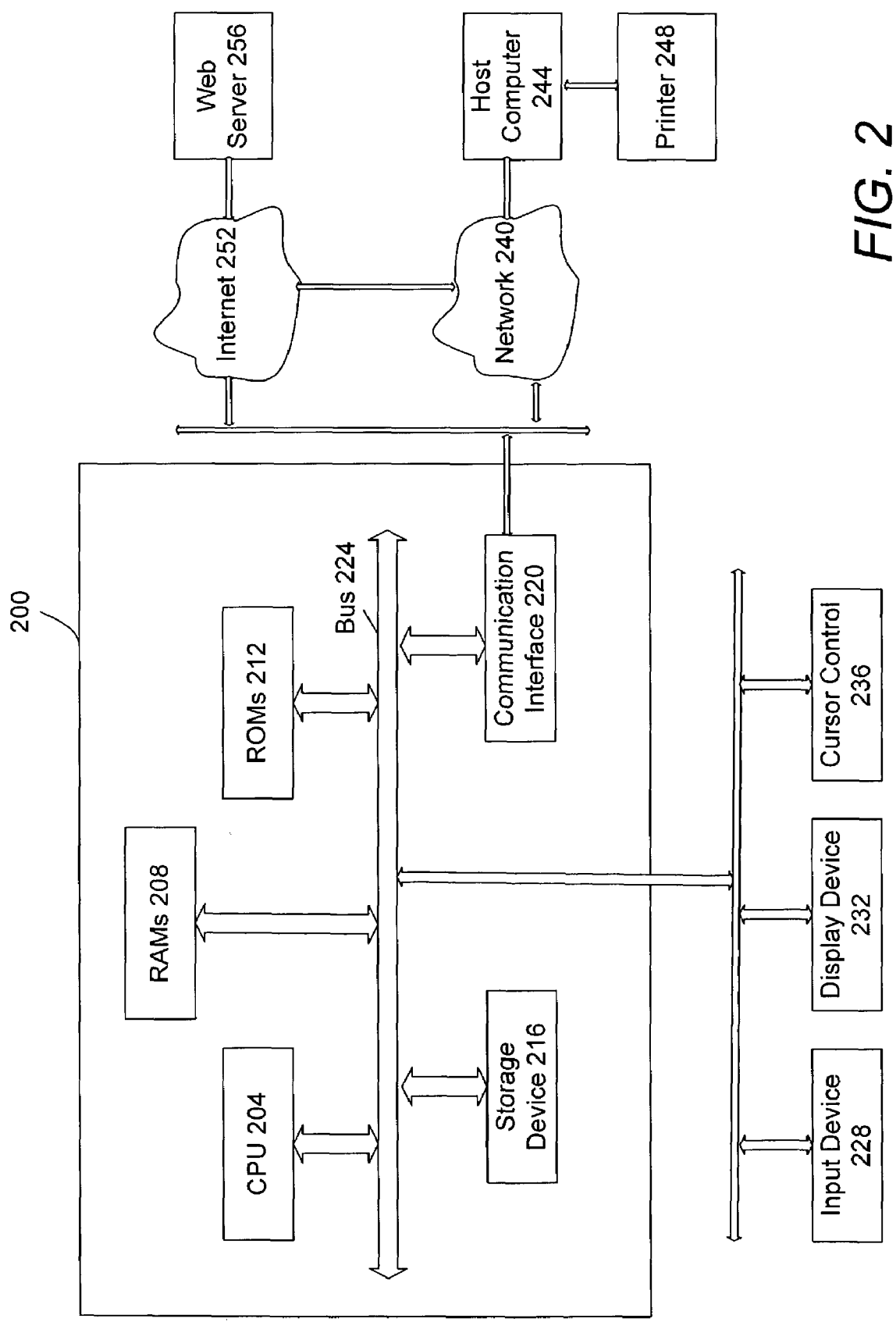
FIG. 2 shows a computer system upon which embodiments of the invention may be implemented.

FIG. 2 is a block diagram showing a computer system 200 upon which embodiments of the invention may be implemented. For example, computer system 200 may be implemented to include system 100, to run programs and perform functions in accordance with the techniques described above, etc. In one embodiment, computer system 200 includes a central processing unit (CPU) 204, random access memories (RAMs) 208, read-only memories (ROMs) 212, a storage device 216, and a communication interface 220, all of which are connected to a bus 224.

CPU 204 controls logic, processes information, and coordinates activities within computer system 200. In one embodiment, CPU 204 executes instructions stored in RAMs 208 and ROMs 212, by, for example, coordinating the movement of data from input device 228 to display device 232. CPU 204 may include one or a plurality of processors.

RAMs 208, usually being referred to as main memory, temporarily store information and instructions to be executed by CPU 204. Information in RAMs 208 may be obtained from input device 228 or generated by CPU 204 as part of the algorithmic processes required by the instructions that are executed by CPU 204.

ROMs 212 store information and instructions that, once written in a ROM chip, are read-only and are not modified or removed. In one embodiment, ROMs 212 store commands for configurations and initial operations of computer system 200.

Storage device 216, such as floppy disks, disk drives, or tape drives, durably stores information for use by computer system 200.

Communication interface 220 enables computer system 200 to interface with other computers or devices. Communication interface 220 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 220 may also allow wireless communications.

Bus 224 can be any communication mechanism for communicating information for use by computer system 200. In the example of FIG. 2, bus 224 is a media for transferring data between CPU 204, RAMs 208, ROMs 212, storage device 216, communication interface 220, etc.

Computer system 200 is typically coupled to an input device 228, a display device 232, and a cursor control 236. Input device 228, such as a keyboard including alphanumeric and other keys, communicates information and commands to CPU 204. Display device 232, such as a cathode ray tube (CRT), displays information to users of computer system 200. Cursor control 236, such as a mouse, a trackball, or cursor direction keys, communicates direction information and commands to CPU 204 and controls cursor movement on display device 232.

Computer system 200 may communicate with other computers or devices through one or more networks. For example, computer system 200, using communication interface 220, communicates through a network 240 to another computer 244 connected to a printer 248, or through the world wide web 252 to a server 256. The world wide web 252 is commonly referred to as the "Internet." Alternatively, computer system 200 may access the Internet 252 via network 240.

Computer system 200 may be used to implement the techniques described above. In various embodiments, CPU 204 performs the steps of the techniques by executing instructions brought to RAMs 208. In alternative embodiments, hard-wired circuitry may be used in place of or in combination with software instructions to implement the described techniques. Consequently, embodiments of the invention are not limited to any one or a combination of software, firmware, hardware, or circuitry.

Instructions executed by CPU 204 may be stored in and/or carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic or electromagnetic waves, capacitive or inductive coupling, etc. As an example, the instructions to be executed by CPU 204 are in the form of one or more software programs and are initially stored in a CD-ROM being interfaced with computer system 200 via bus 224. Computer system 200 loads these instructions in RAMs 208, executes some instructions, and sends some instructions via communication interface 220, a modem, and a telephone line to a network, e.g. network 240, the Internet 252, etc. A remote computer, receiving data through a network cable, executes the received instructions and sends the data to computer system 200 to be stored in storage device 216.

In the foregoing specification, the invention has been described with reference to specific embodiments. However, it will be evident that various modifications and changes may be made without departing from the broader spirit and scope of the invention. Accordingly, the specification and drawings are to be regarded as illustrative rather than as restrictive.

What is claimed is:

1. A method for use in a multi-threaded system, comprising the steps of:
    dedicating a processor identified as a spin-yield processor to run a thread while the thread is waiting for a lock acquired by another thread;
    a first thread acquiring a first lock to run a program portion on a first processor, wherein running the program portion requires the first lock; and
    a second thread, while waiting to acquire the first lock based on a relationship between a context switching threshold and a number of context switches experienced by the second thread within a first defined time period, performs the steps of:
    running on the spin-yield processor;
    trying to acquire the first lock, wherein the second thread acquires the first lock if the first thread yields the first processor; and
        if the second thread does not acquire the first lock, then the second thread repeats the steps of running and trying;
    wherein the second thread, before running on the spin-yield processor the first time, performs the steps of:
    running on the first processor; and
    trying to acquire the first lock;
        if the second thread does not acquire the first lock, then the second thread repeats the steps of running on the first processor and trying to acquire the first lock.

2. The method of claim 1 wherein the second thread repeats the steps of running and trying for a second defined time period.

3. The method of claim 1 wherein the second thread repeats the steps of running on the first processor and trying to acquire the first lock for a second defined time period.

4. The method of claim 1 wherein, if the second thread does not acquire the first lock, then the second thread performs the further step of yielding the spin-yield processor.

5. The method of claim 1 wherein the spin-yield processor is selected from a plurality of processors dedicated for running waiting threads.

6. The method of claim 1 wherein, each time the second thread runs on the spin-yield processor, the spin-yield processor is selected from a plurality of processors dedicated for running waiting threads.

7. The method of claim 1 further comprising the step of allowing a third thread to run on the spin-yield processor based on a number of context switches that the third thread experiences in a second defined time period.

8. The method of claim 1 wherein the second thread quits running on the spin-yield processor based on a number of context switches that the second thread experiences in a second defined time period.

9. A system comprising:
    a processor dedicated to run a thread that is waiting for a lock acquired by another thread;
    the processor being identified as a spin-yield processor;
    a first thread acquiring a first lock to run a program portion on a first processor, wherein running the program portion requires the first lock; and
    a second thread, while waiting to acquire the first lock based on a relationship between a context switching threshold and a number of context switches experienced by the second thread within a first defined time period, performs the steps of:
    running on the spin-yield processor
    trying to acquire the first lock, wherein the second thread acquires the first lock if the first thread yields the first processor; and
        if the second thread does not acquire the first lock, then the second thread repeats the steps of running and trying;
    wherein the second thread, before running on the spin-yield processor the first time, performs the steps of:
    running on the first processor; and
    trying to acquire the first lock;
        if the second thread does not acquire the first lock, then the second thread repeats the steps of running on the first processor and trying to acquire the first lock.

10. The system of claim 9 wherein the second thread repeats the steps of running and trying for a second defined time period.

11. The system of claim 9 wherein, if the second thread repeats the steps of running on the first processor and trying to acquire the first lock for a second defined time period.

12. The system of claim 9 wherein, if the second thread does not acquire the first lock, then the second thread performs the further step of yielding the spin-yield processor.

13. The system of claim 9 wherein the spin-yield processor is selected from a plurality of processors dedicated for running waiting threads.

14. The system of claim 9 wherein, each time the second thread runs on the spin-yield processor, the spin-yield processor is selected from a plurality of processors dedicated for running waiting threads.

15. The system of claim 9 further comprising a third thread that runs on the spin-yield processor based on a number of context switches that the third thread experiences in a second defined time period.

16. The system of claim 9 wherein the second thread quits running on the spin-yield processor based on a number of context switches that the second thread experiences in a second defined time period.

17. A computer-readable medium wherein said computer readable medium is a medium selected from the group consisting of a floppy disk, a hard disk, a zip-drive cartridge, a magnetic tape, a magnetic medium, a DC-ROM, a CD-RAM, a DVD-ROM, a DVD-RAM, an optical medium, a paper tape, a punch card, a pattern of holes, a RAM, a ROM, an EPROM, a memory chip, and a memory cartridge, said computer readable medium embodying instructions for use in a multi-threaded system, the instructions performing the steps of:

defining a time period;

determining a number of context switches experienced by a thread during the defined time period, wherein the thread is waiting for a lock acquired by another thread; and based on a relationship between a context switch threshold and the number of context switches, if the thread has not been bound to a spin-yield processor then binding the thread to the spin-yield processor, else if the thread has been bound to the spin-yield process, then unbinding the thread from the spin-yield processor;

wherein the spin-yield processor is a processor being dedicated to run the thread, wherein the thread acquires the lock if the other thread yields the lock;

wherein the other thread, before running on the spin-yield processor the first time, performs the steps of:

running on a first processor; and trying to acquire the lock;

if the other thread does not acquire the lock, then the other thread repeats the steps of running on the first processor and trying to acquire the lock.

18. The computer-readable medium of claim 17 wherein a context switch is initiated by the thread.

19. The computer-readable medium of claim 17 wherein a context switch is initiated by an operating system running the thread or by a unit other than the thread.

20. The computer-readable medium of claim 17 wherein the spin-yield processor is selected from a plurality of processors.

* * * * *